UNITED STATES PATENT OFFICE.

EDGAR F. PRICE, OF NIAGARA FALLS, NEW YORK, ASSIGNOR, BY MESNE ASSIGNMENTS, TO CENTRAL TRUST COMPANY OF NEW YORK, A CORPORATION OF NEW YORK, TRUSTEE.

PROCESS OF OBTAINING NICKEL FROM SILICIOUS ORES.

No. 909,666.     Specification of Letters Patent.     Patented Jan. 12, 1909.

Application filed July 29, 1907. Serial No. 386,090.

*To all whom it may concern:*

Be it known that I, EDGAR F. PRICE, a citizen of the United States, residing at Niagara Falls, in the county of Niagara and State of New York, have invented certain new and useful Improvements in Processes of Obtaining Nickel from Silicious Ores, of which the following is a specification.

According to this process a silicious ore of nickel and iron is smelted in an electric-arc furnace, carbon being added to the charge in amount sufficient to not only effect reduction of the nickel and iron but also to protect the carbon electrodes from oxidation. The resulting ferro-nickel is then treated with an oxidizing agent, preferably air injected into the molten alloy, and an acid flux, preferably silica, to substantially remove the iron. A molten deoxidizer such as silicon, ferro-silicon or aluminum may be added to the high-nickel products before casting it into ingots.

The electric smelting may be effected in a pot-furnace having depending carbon electrodes of opposite polarity, a considerable body of the charge-mixture being maintained around the zone of reduction to retain the heat and prevent atmospheric oxidation of the electrodes. The potential difference between the electrode terminals is preferably kept at the minimum value requisite for the maintenance of an arc, to prevent leakage of current through the charge. The slag and alloy may be tapped out and fresh ore and carbon supplied at intervals to make the process continuous. A basic flux may be added to slag off the silica, or more or less of the silica may be reduced to give a product low in carbon.

The removal of the iron may be effected in the reduction furnace, provided with twyers at its lower end for the introduction of streams of air, the alloy being thus electrically heated and maintained in a molten condition by electric heat in addition to that supplied during reduction, if necessary. Silica for slagging the oxidized iron may be derived from the charge, or may be independently added. If the product of reduction contains silicon, the oxidation of this silicon supplies heat to maintain the metal in a molten condition and the resulting silica combines with the iron oxid. If preferred, the ferro-nickel may be tapped out of the reduction furnace into a separate converter, for removal of the iron.

I claim:

1. The process of producing ferro-nickel, which consists in electrically smelting a charge containing a silicious ore of nickel and iron and carbon, by establishing and maintaining an electric arc within the charge, and surrounding the zone of reduction and protecting the electrodes from atmospheric oxidation by a considerable body of the charge.

2. The process of obtaining nickel, which consists in electrically reducing silicious ore of nickel and iron by means of carbon, thereby producing ferro-nickel, treating the molten ferro-nickel with air and an acid flux to effect the removal of iron, and treating the high-nickel product with a metallic deoxidizing agent.

3. The process of obtaining nickel, which consists in reducing a silicious ore of nickel and iron by carbon by passing an electric current through the charge, surrounding the zone of reduction and protecting the electrode or electrodes by a considerable body of the charge, and treating the resulting ferro-nickel with an oxidizing agent and an acid flux to effect the removal of iron.

In testimony whereof, I affix my signature in presence of two witnesses.

EDGAR F. PRICE.

Witnesses:
  I. R. EDMONDS,
  H. L. NOYES.